(12) United States Patent
Garelli et al.

(10) Patent No.: US 9,739,929 B2
(45) Date of Patent: Aug. 22, 2017

(54) ELECTRONIC DEVICE WITH LIGHT-EMITTING DIODE ARRAY

(71) Applicant: Apple Inc., Cupertino, CA (US)

(72) Inventors: Adam T. Garelli, Santa Clara, CA (US); Christopher L. Boitnott, Half Moon Bay, CA (US); Dinesh C. Mathew, Fremont, CA (US); Jun Qi, Cupertino, CA (US); Nicholas A. Rundle, San Jose, CA (US); Victor H. Yin, Cupertino, CA (US); Nathan K. Gupta, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 599 days.

(21) Appl. No.: 14/132,346

(22) Filed: Dec. 18, 2013

(65) Prior Publication Data

US 2015/0167951 A1 Jun. 18, 2015

(51) Int. Cl.
 *F21V 8/00* (2006.01)
 *F21K 9/61* (2016.01)
 *F21Y 115/10* (2016.01)

(52) U.S. Cl.
 CPC ........... *G02B 6/0083* (2013.01); *F21K 9/61* (2016.08); *F21Y 2115/10* (2016.08); *G02B 6/0068* (2013.01); *G02B 6/0073* (2013.01)

(58) Field of Classification Search
 CPC . H01L 2224/48091; H01L 2924/00014; H01L 2224/48247; H01L 33/06; H01L 33/32; H01L 33/325; H01L 33/62; H01L 2924/12041; H01L 2924/01013; H01L 2224/05624; H01L 2224/05647; F21Y 2101/02; F21Y 2105/00; F21Y 2115/10; F21K 9/56; F21K 9/30; F21K 9/52; F21K 9/20; F21K 9/61; H05K 2201/10106; H05K 3/0061; H01Q 1/38; B29L 2031/747; G02F 1/133603; F21V 29/006; G02B 6/0083; G02B 6/0073; G02B 6/0068

See application file for complete search history.

(56) References Cited

U.S. PATENT DOCUMENTS

| 7,311,431 | B2 | 12/2007 | Chew et al. |
| 8,223,296 | B2 | 7/2012 | Lee et al. |
| 8,354,686 | B2 | 1/2013 | Jin et al. |
| 8,434,909 | B2 | 5/2013 | Nichol et al. |
| 2002/0113919 | A1* | 8/2002 | Liu .................. G02F 1/133382 349/65 |
| 2008/0170177 | A1* | 7/2008 | Chen .................. G02B 6/0068 349/64 |

(Continued)

*Primary Examiner* — Stephen F Husar
(74) *Attorney, Agent, or Firm* — Treyz Law Group, P.C.; G. Victor Treyz; Joseph F. Guihan

(57) ABSTRACT

Electronic devices may be provided with displays. A display may have a light guide plate. Backlight for the display may be launched into the light guide plate from an array of light-emitting diodes. The light-emitting diodes may be mounted on a metal core printed circuit board having a dielectric layer and a metal layer. The metal core printed circuit board may have an elongated shape that extends along the surface of a metal structure. A weld may be formed along a seam between the metal layer of the metal core printed circuit board and the metal structure. The metal structure may be an electronic device housing, a display chassis member, a heat spreader, a heat pipe, or other structures in an electronic device.

19 Claims, 11 Drawing Sheets

(56) References Cited

U.S. PATENT DOCUMENTS

2011/0249406 A1* 10/2011 Andrews .............. F21V 29/004
                                                    361/704
2013/0271959 A1   10/2013 Woodgate et al.

* cited by examiner

ELECTRONIC DEVICE WITH LIGHT-EMITTING DIODE ARRAY

BACKGROUND

This relates generally to electronic devices and, more particularly, to electronic devices with light-emitting diode arrays.

Electronic devices often include light-emitting diodes. For example, cellular telephones, computers, and televisions have displays that are backlit using light-emitting diodes. A typical backlight includes light-emitting diodes that launch light into the edge of a rectangular light guide plate. Scattered light from the light guide plate serves as backlight for the display.

It can be challenging to provide sufficient backlight illumination in a display. For example, in large displays, backlight requirements scale with increasing area, whereas the space available for light-emitting diodes along the edges of a light guide plate tends to scale only with the edge length of the light guide plate. There may therefore be a need to closely space light-emitting diodes, leading to heat buildup during operation.

Light-emitting diode lifetimes can be significantly affected by changes in operating temperature. High temperatures can degrade performance rapidly. For example, an operating temperature increase of 20° C. may reduce light-emitting diode lifetime by a factor of two or more.

It would therefore be desirable to be able to provide an electronic device with improved light-emitting diode heat sinking capabilities.

SUMMARY

An electronic device may have light-emitting diodes. The light-emitting diodes may be mounted to a metal core printed circuit board that is attached to a metal structure using a weld. The electronic device may have a display. The display may have a backlight. The backlight may illuminate an array of display pixels in the display. The backlight may have a light guide plate that distributes light across the display. The light guide plate may be formed form a rectangular plastic member having an edge surface. Backlight for the display may be launched into the edge surface of the light guide plate from the light-emitting diodes.

The light-emitting diodes may be mounted in an array on the metal core printed circuit board. The metal core printed circuit board has a dielectric layer and a metal layer. The metal core printed circuit board may have an elongated shape that extends along the surface of the metal structure. A weld may be formed along a seam between the metal layer of the metal core printed circuit board and the metal structure. The metal structure may be an electronic device housing, a display chassis member, a heat spreader, a heat pipe, or other structures in an electronic device.

DETAILED DESCRIPTION

Electronic devices may be provided with light-emitting diodes. An electronic device may have a display with a backlight. The backlight may include one or more arrays of the light-emitting diodes.

The light-emitting diodes in a backlight for a display may launch light into one or more edges of a light guide plate. The light guide plate may laterally distribute the light across the display. Light that is scattered outwards from the light guide plate may serve as backlight for the display.

Illustrative electronic devices that may be provided with displays having arrays of light-emitting diodes that provide light for a display backlight are shown in FIGS. 1, 2, 3, and 4.

Figure 1:
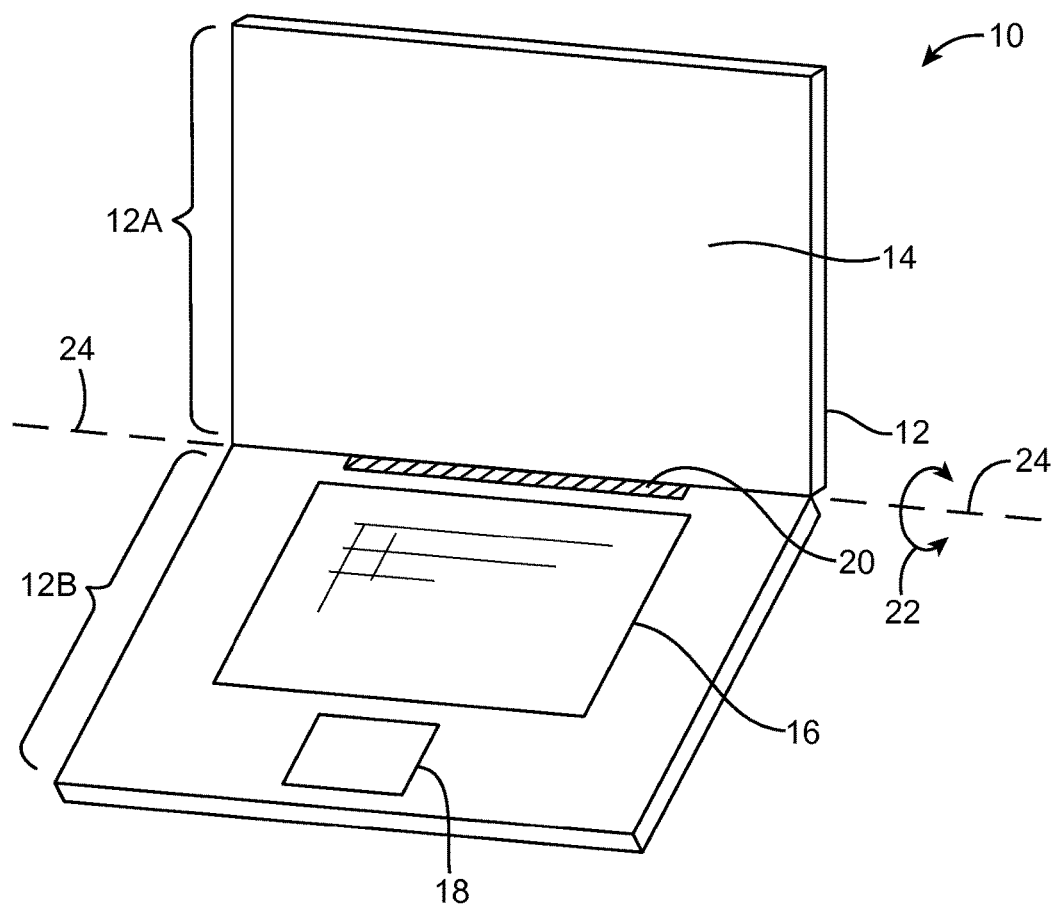
FIG. 1 is a perspective view of an illustrative electronic device such as a laptop computer in accordance with an embodiment.

Electronic device 10 of FIG. 1 has the shape of a laptop computer and has upper housing 12A and lower housing 12B with components such as keyboard 16 and touchpad 18. Device 10 has hinge structures 20 (sometimes referred to as a clutch barrel) to allow upper housing 12A to rotate in directions 22 about rotational axis 24 relative to lower housing 12B. Display 14 is mounted in housing 12A. Upper housing 12A, which may sometimes be referred to as a display housing or lid, is placed in a closed position by rotating upper housing 12A towards lower housing 12B about rotational axis 24.

Figure 2:
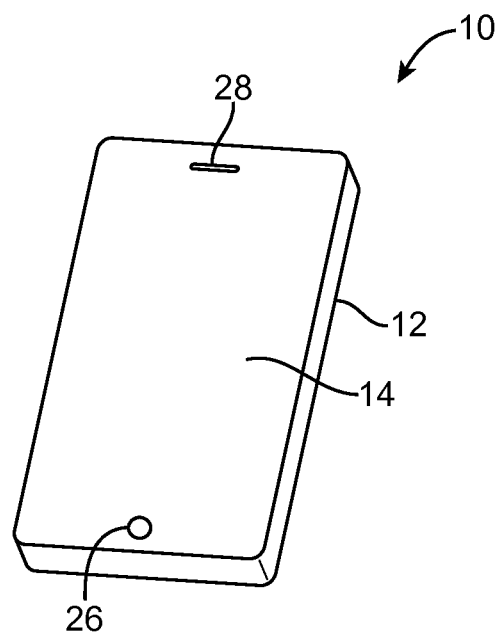
FIG. 2 is a perspective view of an illustrative electronic device such as a handheld electronic device in accordance with an embodiment.

FIG. 2 shows an illustrative configuration for electronic device 10 based on a handheld device such as a cellular telephone, music player, gaming device, navigation unit, or other compact device. In this type of configuration for device 10, housing 12 has opposing front and rear surfaces.

Display 14 is mounted on a front face of housing 12. Display 14 may have an exterior layer that includes openings for components such as button 26 and speaker port 28.

Figure 3:
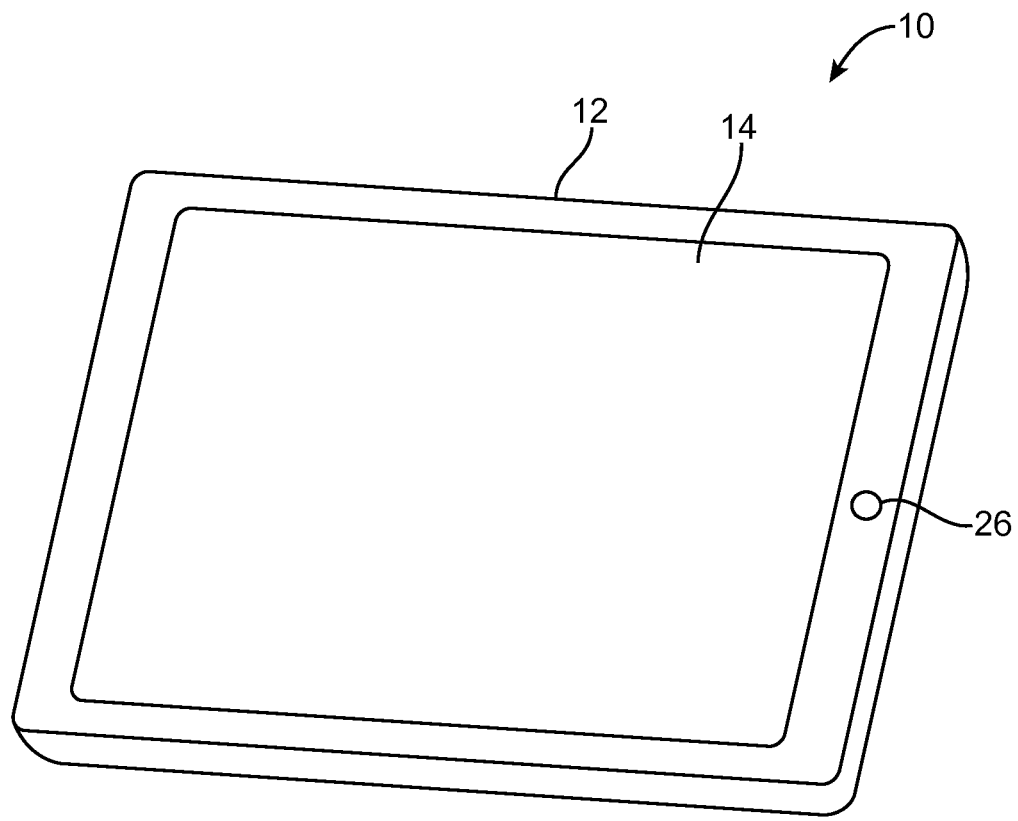
FIG. 3 is a perspective view of an illustrative electronic device such as a tablet computer in accordance with an embodiment.

In the example of FIG. 3, electronic device 10 is a tablet computer. In electronic device 10 of FIG. 3, housing 12 has opposing planar front and rear surfaces. Display 14 is mounted on the front surface of housing 12. As shown in FIG. 3, display 14 has an opening to accommodate button 26.

Figure 4:
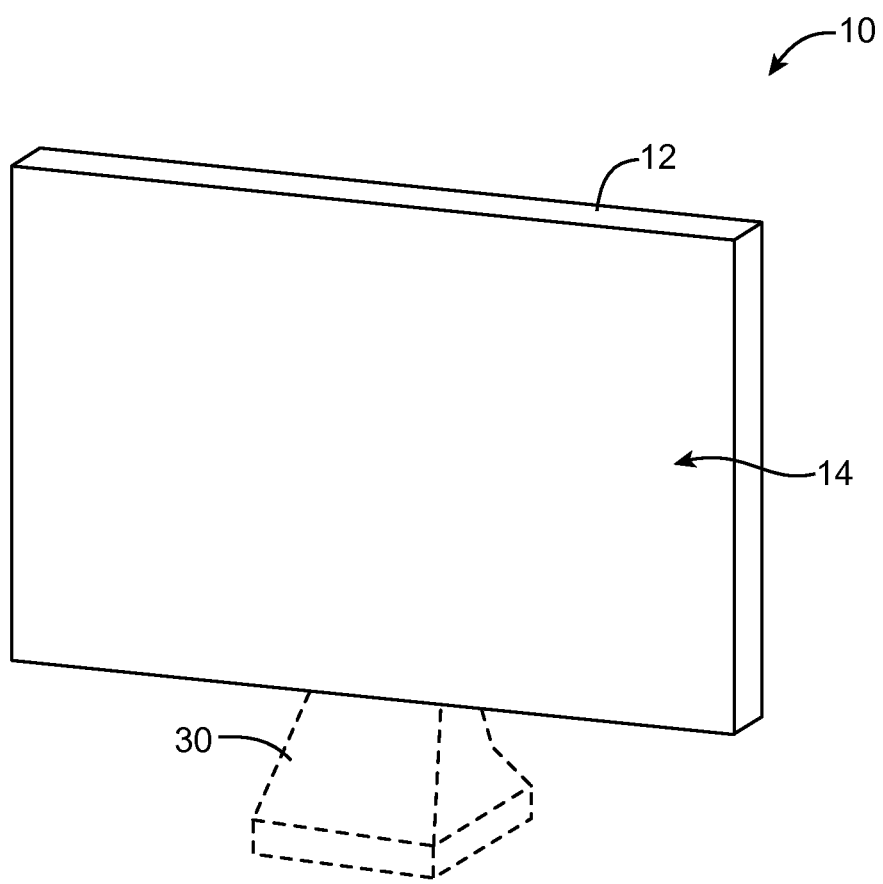
FIG. 4 is a perspective view of an illustrative electronic device such as a display for a computer or television in accordance with an embodiment.

FIG. 4 shows an illustrative configuration for electronic device 10 in which device 10 is a computer monitor (display), a computer that has an integrated computer display, or a television. Display 14 is mounted on a front face of housing 12 (i.e., a computer monitor housing, a computer housing, a television housing, etc.). With this type of arrangement, housing 12 for device 10 may be mounted on a wall or may have an optional structure such as support stand 30 to support device 10 on a flat surface such as a tabletop or desk.

Display 14 may be a liquid crystal display, an electrophoretic display, an electrowetting display, a display using other types of display technology, or a display that includes display structures formed using more than one of these display technologies. Display 14 may have light-emitting diodes for producing backlight. Light-emitting diodes may also be used as status indicators, camera flash elements, or as other components in device 10. Illustrative configurations for device 10 in which light-emitting diodes are used for producing backlight in a backlight liquid crystal display are sometimes described herein as an example.

Figure 5:
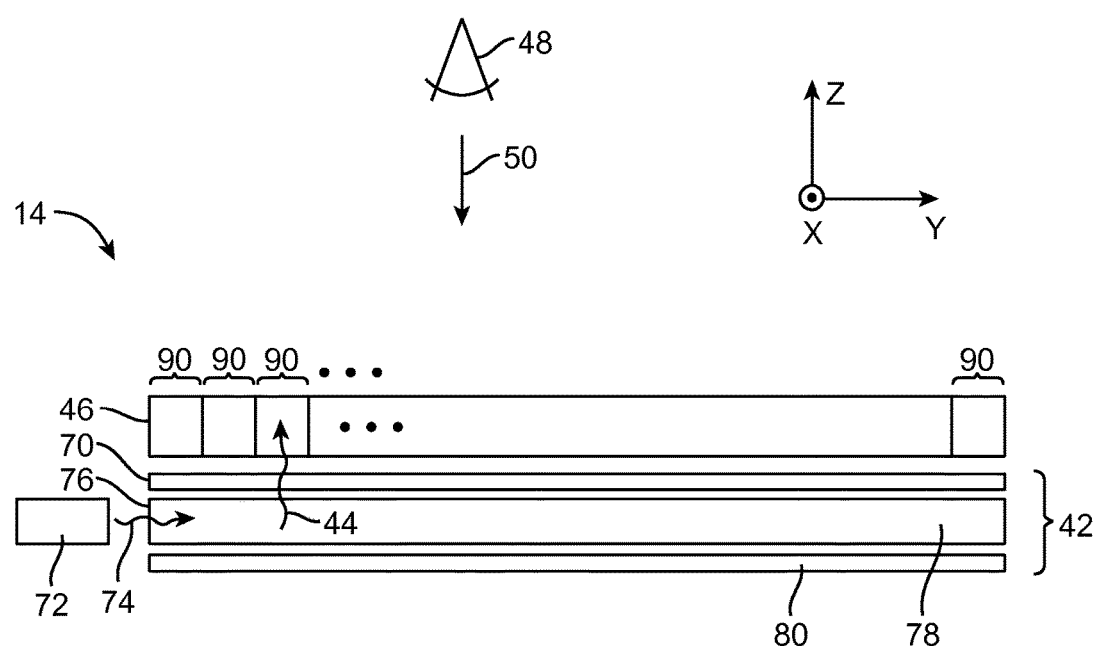
FIG. 5 is a cross-sectional side view of an illustrative display illuminated with light-emitting diodes in accordance with an embodiment.

A cross-sectional side view of an illustrative configuration for display 14 of device 10 (e.g., a liquid crystal display for the devices of FIG. 1, FIG. 2, FIG. 3, FIG. 4 or other suitable electronic devices) is shown in FIG. 5. As shown in FIG. 5, display 14 may include backlight structures such as backlight structures 42 for producing backlight 44. During operation, backlight 44 travels outwards (vertically upwards in dimension Z in the orientation of FIG. 5) and travels away from backlight 42 through display pixels 90 in display layers 46. This illuminates any images that are being produced by the display pixels for viewing by a user. For example, backlight 44 may illuminate images on display layers 46 that are being viewed by viewer 48 in direction 50.

Display layers 46 may be mounted in chassis structures such as a plastic display chassis structure and/or a metal display chassis structure to form a display module for mounting in housing 12 or display layers 46 may be mounted directly in housing 12 (e.g., by stacking display layers 46 into a recessed portion in housing 12).

Display layers 46 may include a liquid crystal layer. The liquid crystal layer may be sandwiched between display layers such as a color filter layer and a thin-film transistor layer. The color filter layer, liquid crystal layer, and the thin-film transistor layer may be sandwiched between a lower (innermost) polarizer layer and an upper (outermost) polarizer layer.

The color filter layer and thin-film transistor layer may be formed from transparent substrate layers such as clear layers of glass or plastic. Conductive traces, color filter elements, transistors, and other circuits and structures may be formed on the substrates (e.g., to form a thin-film transistor layer and/or a color filter layer). Touch sensor electrodes may also be incorporated into display layers 46.

During operation of display 14 in device 10, control circuitry (e.g., one or more integrated circuits on a printed circuit) may be used to generate information to be displayed on display 14 (e.g., display data). The information to be displayed may be conveyed to display driver circuitry. The display driver circuitry may display corresponding images on an array of display pixels 90. Backlight 44 may pass through display pixels 90 to illuminate display 14.

Backlight structures 42 may include a light guide plate such as light guide plate 78. Light guide plate 78 may be formed from a transparent material such as clear glass or plastic. During operation of backlight structures 42, a light source such as light source 72 may generate light 74. Light source 72 may be, for example, an array of light-emitting diodes.

Light 74 from light sources such as light source 72 may be coupled into one or more edges of light guide plate 78. In the example of FIG. 5, light 74 is coupled into the left-hand edge of rectangular light guide plate 78. If desired, light 74 may be coupled into a pair of opposing edges of a rectangular light guide plate from a pair of light sources 72 or may be coupled into all four edges of a rectangular light guide plate using four respective light sources. The example of FIG. 5 is merely illustrative.

As shown in FIG. 5, light 74 may be coupled into the interior of light guide plate 78 through edge surface 76 of light guide plate 78. Once inside of light guide plate, light 74 may be distributed laterally in dimensions X and Y throughout light guide plate 78 due to the principal of total internal reflection. Light guide plate 78 may include light-scattering features such as pits or bumps. The light-scattering features may be located on an upper surface and/or on an opposing lower surface of light guide plate 78.

Light 74 that scatters upwards in direction Z from light guide plate 78 may serve as backlight 44 for display 14. Light 74 that scatters downwards may be reflected back in the upwards direction by reflector 80. Reflector 80 may be formed from a reflective material such as a layer of white plastic or other shiny materials.

To enhance backlight performance for backlight structures 42, backlight structures 42 may include optical films 70. Optical films 70 may include diffuser layers for helping to homogenize backlight 44 and thereby reduce hotspots, compensation films for enhancing off-axis viewing, and brightness enhancement films (also sometimes referred to as turning films) for collimating backlight 44. Optical films 70 may overlap the other structures in backlight unit 42 such as light guide plate 78 and reflector 80. For example, if light guide plate 78 has a rectangular footprint in the X-Y plane of FIG. 5, optical films 70 and reflector 80 may have a matching rectangular footprint.

Figure 6:
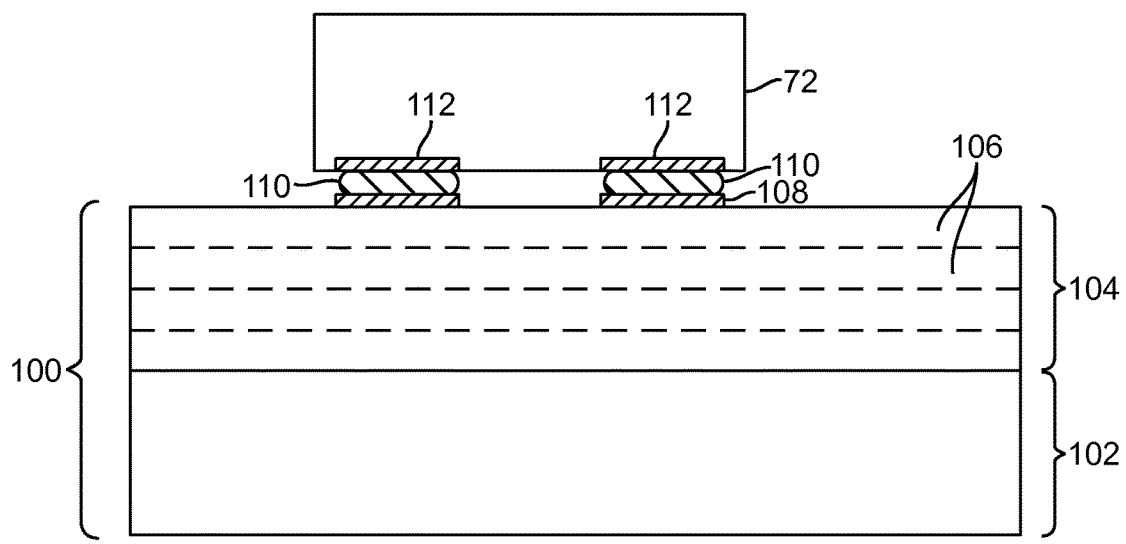
FIG. 6 is a cross-sectional side view of a light-emitting diode mounted to a metal core printed circuit board in accordance with an embodiment.

Light-emitting diodes 72 may be mounted on metal core printed circuit boards such as metal core printed circuit board 100 of FIG. 6. As shown in FIG. 6, metal core printed circuit board 100 may have a metal layer such as metal layer 102. Metal layer 102 may be formed from a metal such as aluminum or copper. Dielectric 104 may be formed on metal layer 102. Dielectric layer 104 may include metal traces such as metal traces 108 and multiple sublayers 106. Metal traces 108 may include horizontal metal traces extending horizontally across layers 106, surface traces for forming contacts, and vertical via structures running vertically through layers 106. Metal traces 108 may be formed form a metal such as copper (as an example). The metal traces in dielectric layer 104 may be used for routing signals within metal core printed circuit board 100 (e.g., power signals for powering light-emitting diodes such as diode 72).

The dielectric material that forms dielectric layer 104 preferably has a high thermal conductivity to help conduct heat away from light emitting diodes 72. For example, the dielectric material that forms dielectric layer 104 may be a polymer that is filled with a filler having a high thermal conductivity. The filler may be, as an example, particles of boron nitride, aluminum oxide, or aluminum nitride or other particles that have high thermal conductivity and that can be embedded within the polymer to enhance the thermal conductivity of dielectric layer 104.

Light-emitting diodes such as light-emitting diode 72 may have contacts such as contacts 112. Contacts 112 may be soldered to contacts such as traces 108 of FIG. 6 on metal core printed circuit board 100. For example, solder 110 may be used in soldering an array of light-emitting diodes 72 to metal core printed circuit board 100. Printed circuit 100 may have an elongated shape that extends into the page of FIG. 6 and an array of light-emitting diodes 72 on printed circuit 100 may likewise extend into the page of FIG. 6.

The presence of metal layer 102 (i.e., a metal core) in metal core printed circuit board 100 helps conduct heat away from light-emitting diode 72 during operation. To effectively conduct heat away from metal layer 102, metal layer is preferably thermally coupled to metal structures in device 10 such as housing 12, internal frame or chassis structures, a heat pipe, a heat sink, or other thermally conductive structures. Thermal coupling may be accomplished using thermal compound, thermally conductive adhesive, screws or other mechanical fasteners, solder, or welds. An advantage of using welds is that welds are mechanically stable and exhibit superior thermal conductivity compared to other coupling mechanisms.

Figure 7:
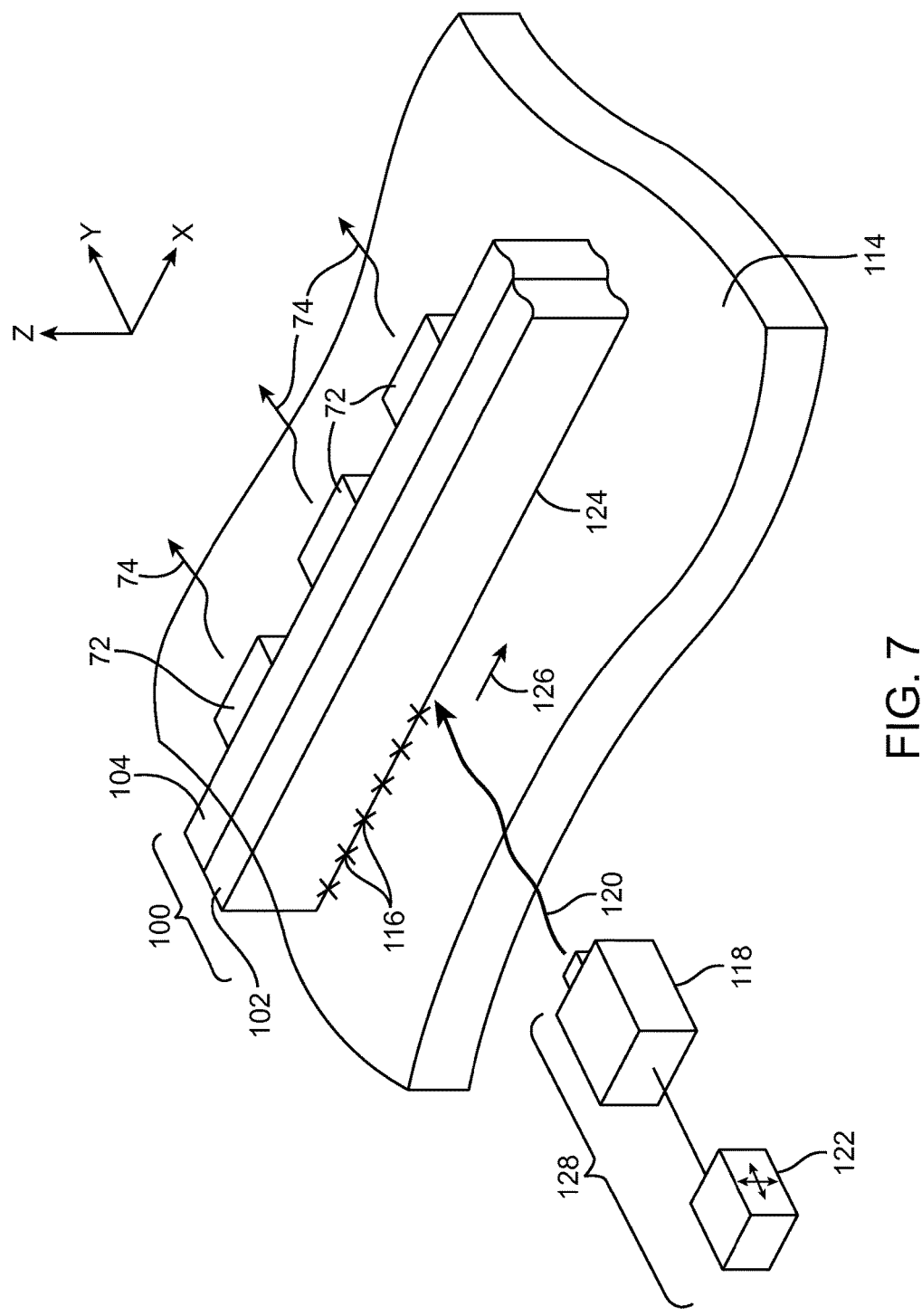
FIG. 7 is a perspective view of an illustrative light-emitting diode array mounted to a metal core printed circuit board that is welded to a metal structure such as an electronic device housing or a display chassis in accordance with an embodiment.

Welds may be formed using laser welding equipment or other suitable welding tools. An illustrative welding arrangement is shown in FIG. 7. As shown in FIG. 7, light-emitting diodes 72 may be soldered to metal core printed circuit board 100. Metal core printed circuit board 100 may have an elongated shape supporting an array of light-emitting diodes 72 that extend along the length of metal core printed circuit board 100. In this type of configuration, metal layer 102 is an elongated metal layer (i.e., an elongated metal strip having a width in dimension Z of 0.2 to 4 mm or other suitable width, a thickness in dimension Y of 0.02 to 2 mm or other suitable thickness, and a length in dimension X of 2 to 3000 cm or other suitable length) and dielectric layer 104 is a correspondingly elongated dielectric layer. Light-emitting diodes in display 14 may be edge-emitting diodes or surface-emitting diodes. In the example of FIG. 7, light-emitting diodes 72 are surface-emitting light-emitting diodes that emit light horizontally along the X-axis of FIG. 7.

Laser welding tool 128 may have a computer-controlled positioner such as positioner 122 that controls the position of laser 118. Laser 118 may be a visible laser, an infrared laser, a gas laser, a solid state laser, a diode laser, a pulsed laser, a continuous wave laser, or other suitable laser. With one suitable arrangement, laser 118 is a Nd:YAG (neodymium-doped yttrium aluminum garnet) laser operating at a wavelength of 1064 nm with a power of about 400-600 W. During operation, positioner 122 may move laser 118 so that laser beam 120 runs along seam 124 between metal layer 102 and metal structure 114 in direction 126 (i.e., a direction parallel to the longitudinal axis of elongated metal core printed circuit board 100), thereby creating weld 116 along the seam between layer 102 and structure 114. Focusing optics may be used to focus beam 120 to a spot size of about 40 to 100 microns. Application of laser light 120 to the seam between metal layer 102 and metal structure 114 welds the metal core of metal core printed circuit board 100 to metal structure 114, forming a welded seam that is characterized by good mechanical strength and high thermal conductivity.

To form satisfactory welds 116, it may be desirable to weld structures together that are formed from identical metals. For example, if metal layer 102 is formed from aluminum, it may be desirable to weld layer 102 to a metal structure 114 that is also formed from aluminum. If metal layer 102 is formed from copper, welds 116 can be formed to weld layer 102 to a copper metal structure 114. Other welding arrangements may be used if desired (e.g., other arrangements in which metal layer 102 and metal structure 114 are formed from the same metal).

Metal structure 114 may be a structure such as electronic device housing (case) 12, an internal frame or chassis structure such as a metal display chassis (sometimes referred to as an m-chassis), a heat pipe, a heat sink, a metal structure such as a housing, chassis, heat spreader, or heat pipe having integral heat sink fins or other structures to enhance heat dissipation, or other thermally conductive structures.

Figure 8:
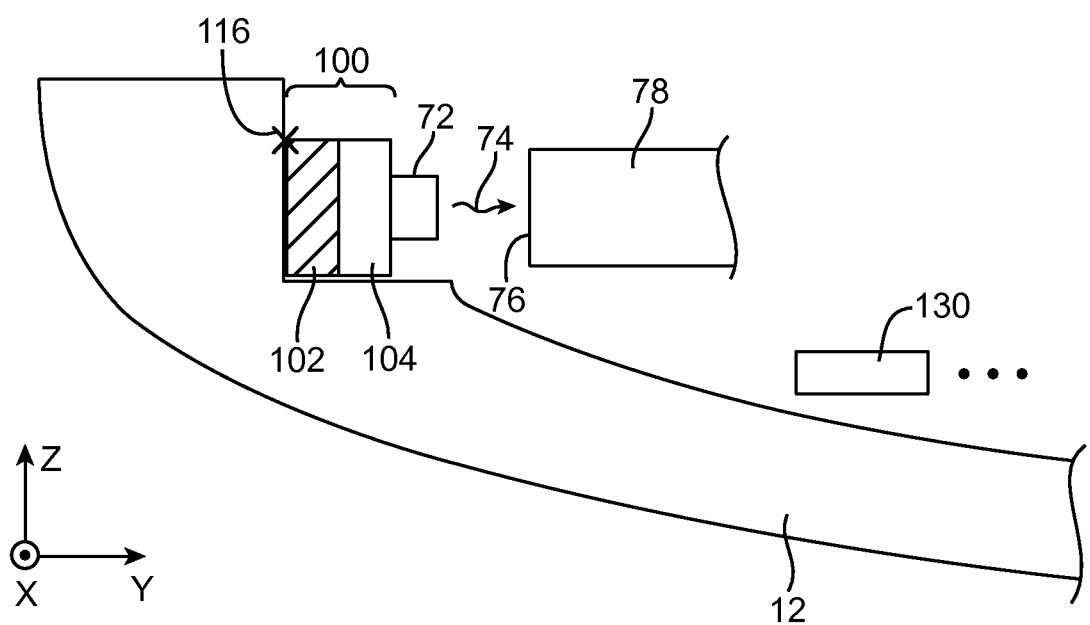
FIG. 8 is a cross-sectional side view of an illustrative light-emitting diode array mounted to a metal core printed circuit board that is welded to an electronic device housing in accordance with an embodiment.

In the illustrative configuration of FIG. 8, an array of light-emitting diodes 72 (i.e., an array extending into the page of FIG. 8) is shown that has been mounted on a metal core printed circuit board 100 that is welded to housing 12 using welds 116. Light 74 is launched horizontally into edge 76 of light guide plate 78. In this configuration, metal housing 12 serves as metal structure 114 of FIG. 7. Housing 12 may be a laptop computer housing, a computer monitor housing, a display housing for a display that includes and integrated computer, a television housing, or other electronic device housing.

Components 130 may be mounted within housing 12 (e.g., components 130 may be mounted under light guide plate 78). Components 130 may include batteries, printed circuit boards, integrated circuits, switches, sensors, input-output devices, etc.

It may be desirable to form housing 12 from a material such as aluminum that can form an aesthetically pleasing enclosure for device 10. It may also be desirable to form metal layer 102 from aluminum, because aluminum may serve as an effective thermal conductor for metal core printed circuit board 100. When aluminum is used to form both layer 102 and housing 12, welds 116 may be effectively formed to weld layer 102 to housing 12. During operation of light-emitting diodes 72, heat is conducted to housing 12. The size and surface area of housing 12 helps draw heat away from light-emitting diodes 72. In this way, housing 12 can serve as a heat sink that dissipates heat and cools light-emitting diodes 72.

Figure 9:
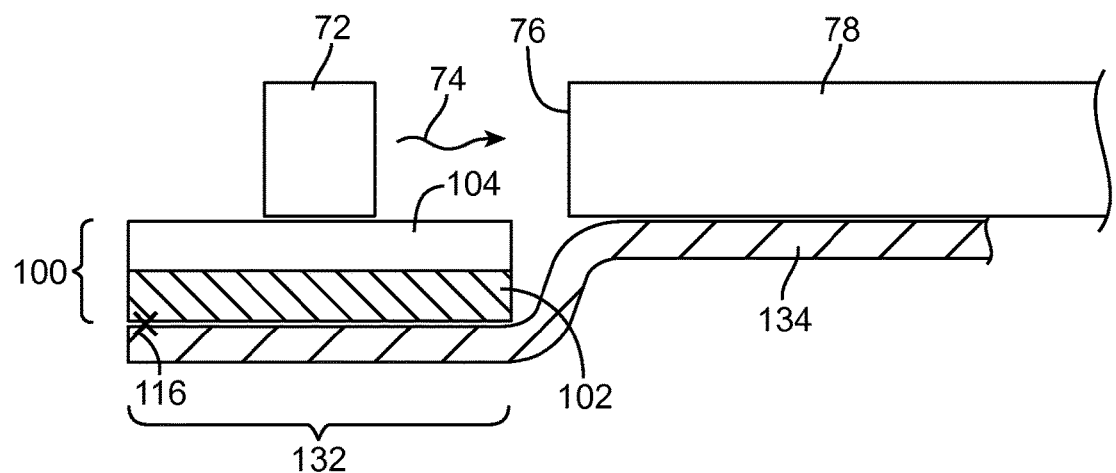
FIG. 9 is a cross-sectional side view of an illustrative light-emitting diode array that is mounted to a metal core printed circuit board that is welded to a metal chassis structure in accordance with an embodiment.

In the illustrative configuration of FIG. 9, light-emitting diodes 72 are edge-emitting light-emitting diodes that extend in an array into the page of FIG. 9. Edge-emitting light-emitting diodes on a metal core printed circuit board may be mounted on a metal housing structure, a metal display chassis, or other metal structures. In the example of FIG. 9, metal core printed circuit board 100 is mounted on recessed portion 132 of metal display chassis structure 134 (i.e., metal chassis structure 134 serve as metal structure 114 of FIG. 7). Laser welding or other welding techniques may be used to form a weld such as weld 116 that runs along the seam between metal layer 102 and portion 132 of metal chassis 134.

Figure 10:
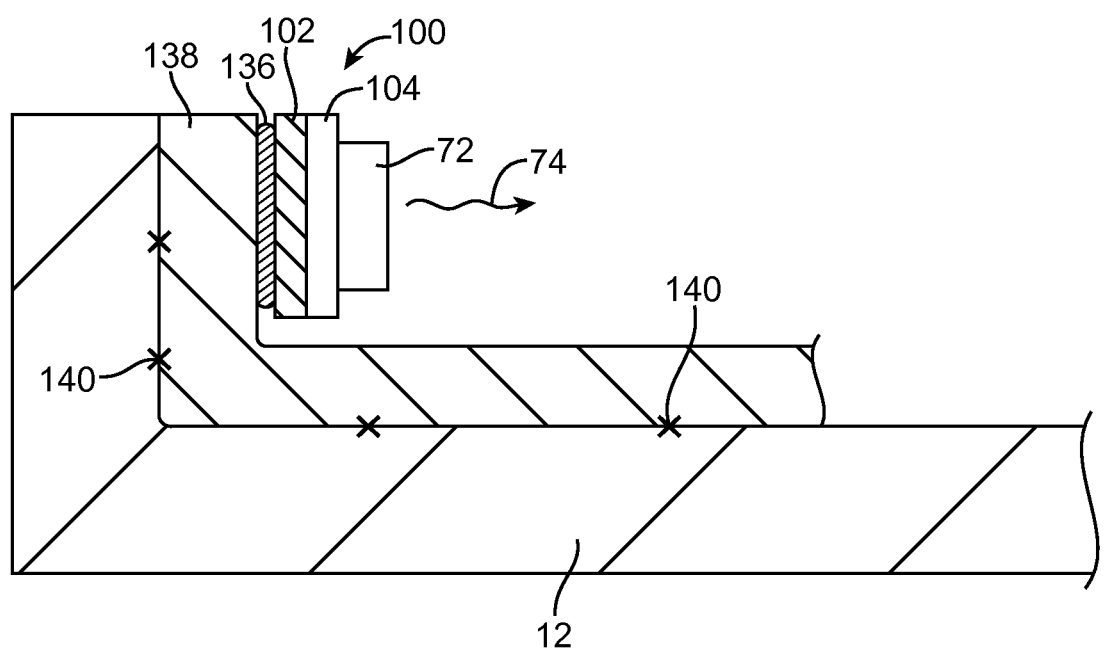
FIG. 10 is a cross-sectional side view of an illustrative light-emitting diode array that is mounted to a metal core printed circuit board that is soldered to a metal structure such as a heat spreader that is mounted to an electronic device housing in accordance with an embodiment.

FIG. 10 shows an illustrative arrangement for device 10 in which metal layer 102 of metal core printed circuit board 100 has been attached to internal metal structure 138 (i.e., metal structure 114 of FIG. 7). Metal layer 102 and metal structure 138 may be formed form a material such as copper or other suitable metal. Solder 136 or other coupling structures (e.g., welds, screws, thermally conductive adhesive, etc.) may be used in mounting layer 102 to structure 138.

Metal core printed circuit board 100 may be an elongated structure that runs along a longitudinal axis that extends into the page of FIG. 10.

Structures 138 may serve as a heat sink or heat spreader that helps draw heat away from light-emitting diodes 72. As shown in the illustrative configuration of FIG. 10, structure 138 may be attached to housing 12 (e.g., an aluminum electronic device housing for device 10) using welds 140 or other suitable coupling mechanisms (solder, thermally conductive adhesive, screws, etc.). With an arrangement of the type shown in FIG. 10, heat may be efficiently drawn away from diodes 72 by using a high conductivity material such as copper for layer 102. Compatibility between layers 102 and 138 to facilitate coupling (e.g., welding) of layers 102 and 138 together may be achieved by forming structure 138 from the same material as layer 102 (e.g., by forming structure 138 from copper in this example). A metal such as aluminum or other suitable material may be used for forming housing 12. Housing 12 may be coupled to heat spreader 138 using connections 140, thereby allowing housing 12 to help draw away heat from diodes 72.

Figure 11:
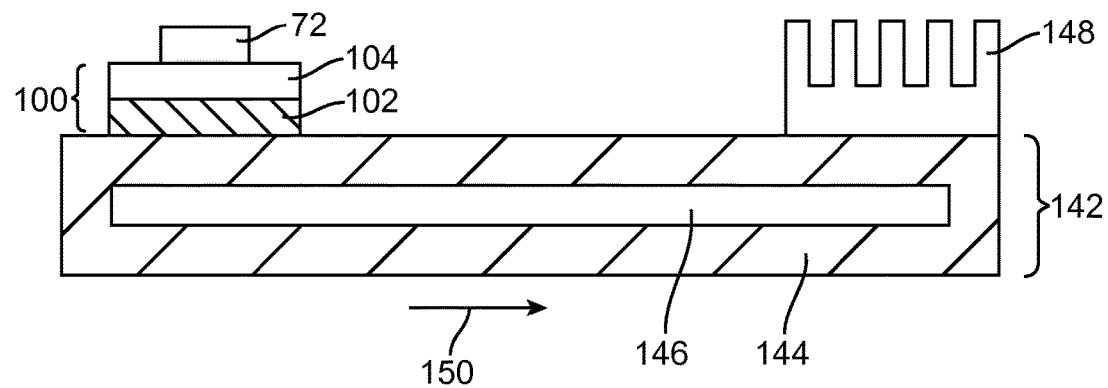
FIG. 11 is a cross-sectional side view of an illustrative heat pipe to which a metal core printed circuit board carrying a light-emitting diode has been welded in accordance with an embodiment.

Heat pipes may be used in conducting heat away from light-emitting diodes 72. This type of configuration is shown in FIG. 11. As shown in FIG. 11, an array of light-emitting diodes 72 may be mounted on metal core printed circuit 100. Metal core printed circuit board 100 may have an elongated shape running along a longitudinal axis that extends into the page of FIG. 11. The array of light-emitting diodes on printed circuit 100 may likewise extend into the page of FIG. 11.

Heat pipe 142 of FIG. 11 may have a metal wall such as wall 144 that surrounds an inner cavity 146. Fluid in inner cavity 146 may facilitate heat transfer by pipe 142 in direction 150 from light-emitting diode 72 to heat sink 148. Metal layer 102 of metal core printed circuit board 100 and optional heat sink structure 148 may be attached to heat pipe 142 using welds, solder, fasteners, thermal compound, thermally conductive adhesive, etc. Heat pipe 142 may have the shape of a plate, a series of wound coils, or other suitable shape.

In the example of FIG. 11, heat sink 148 has fins for dissipating heat. If desired, the metal structure to which metal layer 102 is attached may be provided with integral fins. For example, heat pipe 142 may be provided with integral fins, metal housing 12 may be provided with integral heat sink fins, integral heat sink fins may be formed in a heat spreader, in a metal display chassis, or other metal structures 114 may be provided with integral heat sink structures such as fins.

Figure 12:
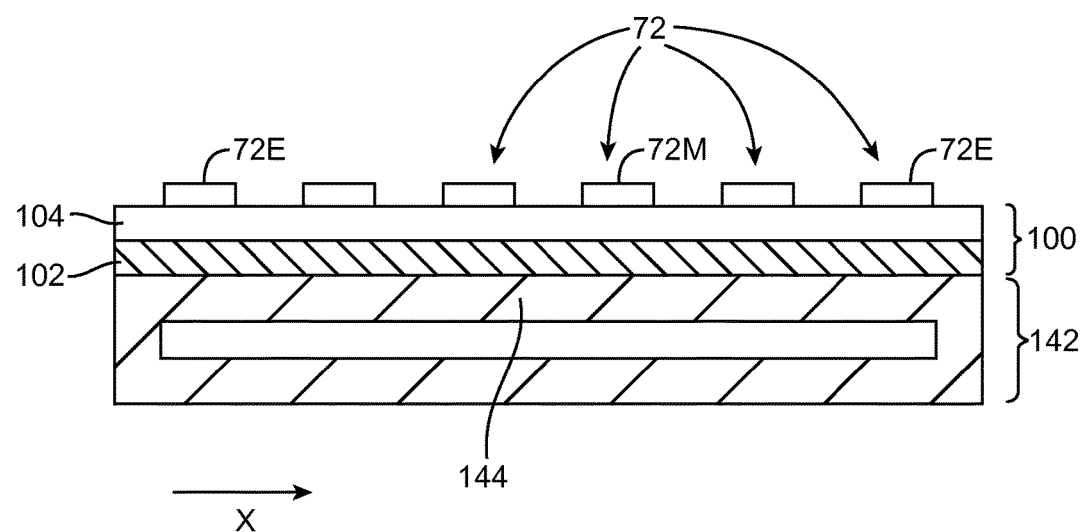
FIG. 12 is a cross-sectional side view of an illustrative heat pipe to which a metal core printed circuit board with an array of light-emitting diodes has been mounted in accordance with an embodiment.

If desired, heat pipe 142 may be used to help equalize the operation temperature of diodes 72 in an array of light-emitting diodes. As shown in FIG. 12, for example, metal layer 102 of metal core printed circuit board 100 may be welded or otherwise attached to metal wall 144 of heat pipe 142. Heat pipe 142 may be welded to housing 12 or other metal structure in device 10 or may be otherwise mounted in device 10. During operation of light-emitting diodes 72, heat is distributed laterally along the X-axis of FIG. 12. This helps ensure that all of diodes 72 are operating at substantially similar temperatures. In the absence of heat pipe 142, central diode 72M may become hotter than end diodes 72E, because end diodes 72E are not surrounded on both sides by adjacent heat-producing diodes. When heat pipe 142 is used, however, heat is distributed evenly along the length of heat pipe 142 and metal layer 104, so that diodes 72 such as diodes 72E and 72M are maintained at the same operating temperature. Premature aging of a subset of diodes 72 such as diodes 72M is thereby avoided.

The foregoing is merely illustrative and various modifications can be made by those skilled in the art without departing from the scope and spirit of the described embodiments. The foregoing embodiments may be implemented individually or in any combination.

What is claimed is:

1. Apparatus, comprising:
   a metal core printed circuit board having a dielectric layer on a metal layer;
   a light-emitting diode mounted to the dielectric layer;
   a metal structure welded to the metal layer; and
   a display backlight, wherein the display backlight includes a light guide plate into which light is emitted from the light-emitting diode.

2. The apparatus defined in claim 1 wherein the metal structure comprises an electronic device housing.

3. The apparatus defined in claim 2 wherein the electronic device housing is formed from aluminum, and wherein the metal layer is an aluminum layer.

4. The apparatus defined in claim 3 wherein the electronic device housing comprises a housing selected from the group consisting of: a laptop computer housing, a computer monitor housing, and a television housing.

5. The apparatus defined in claim 1 wherein the metal structure comprises a display chassis.

6. The apparatus defined in claim 5 wherein the display chassis and the metal layer are formed from a common metal.

7. The apparatus defined in claim 1 wherein the metal structure comprises a copper heat spreader, and wherein the apparatus further comprises an electronic device housing to which the copper heat spreader is mounted.

8. The apparatus defined in claim 1 wherein the metal structure comprises a heat pipe.

9. The apparatus defined in claim 8 wherein the light-emitting diode comprises one of a plurality of light-emitting diodes arranged in an array along the heat pipe.

10. The apparatus defined in claim 1 wherein the light-emitting diode comprises one of a plurality of light-emitting diodes arranged in an array.

11. The apparatus defined in claim 1 wherein the metal structure comprises a display chassis, and wherein the display chassis is welded to the metal layer.

12. An electronic device, comprising:
    a metal housing;
    a metal core printed circuit board having a dielectric layer on a metal layer;
    an array of light-emitting diodes mounted on the dielectric layer, wherein the metal layer is welded to the metal housing; and
    a display backlight, wherein the display backlight has a light guide plate into which light from the array of light-emitting diodes is launched.

13. The electronic device defined in claim 12 wherein the light-emitting diodes comprise surface-emitting light-emitting diodes and wherein the metal layer comprises an elongated metal strip that is welded to the metal housing along a seam between the elongated metal strip and the metal housing.

14. The electronic device defined in claim 13 wherein the metal housing comprises aluminum and wherein the metal strip comprises aluminum.

15. The electronic device defined in claim 12, wherein the metal housing forms at least a portion of an exterior of the electronic device.

16. Apparatus, comprising:
- an elongated metal core printed circuit board having a dielectric layer on a metal layer, wherein the dielectric layer includes metal traces used for routing signals that are separate from the metal layer;
- an array of light-emitting diodes extending along the elongated metal core printed circuit board and soldered to contacts on the dielectric layer; and
- a metal structure attached to the metal layer with a weld along a seam between the metal layer and the metal structure.

17. The apparatus defined in claim 16 further comprising a display, wherein the display has a transparent light guide plate with an edge surface and wherein the array of light-emitting diodes emit light into the edge surface of the light guide plate.

18. The apparatus defined in claim 17 wherein the metal structure comprises a metal display chassis in the display.

19. The apparatus defined in claim 17 wherein the metal structure comprises an electronic device housing.

* * * * *